US008469804B2

(12) United States Patent
Rommerdahl et al.

(10) Patent No.: US 8,469,804 B2

(45) **Date of Patent: *Jun. 25, 2013**

(54) GAMES, GAMING MACHINES, SYSTEMS AND METHOD HAVING A HORSERACE BONUS FEATURE

(75) Inventors: William Rommerdahl, Huntington Beach, CA (US); David B. Schultz, Henderson, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/567,693

(22) Filed: Aug. 6, 2012

(65) Prior Publication Data

US 2012/0295690 A1 Nov. 22, 2012

Related U.S. Application Data

(63) Continuation of application No. 12/828,225, filed on Jun. 30, 2010, now Pat. No. 8,241,113.

(60) Provisional application No. 61/261,705, filed on Nov. 16, 2009.

(51) Int. Cl.
*A63F 9/24* (2006.01)
*A63F 13/00* (2006.01)

(52) U.S. Cl.
USPC .................... 463/27; 463/16; 463/20; 463/25

(58) Field of Classification Search
USPC ................ 463/16–20, 25–29; 273/138.1, 139
See application file for complete search history.

(56) References Cited

U.S. PATENT DOCUMENTS

| | | | | |
|---|---|---|---|---|
| 5,664,998 | A * | 9/1997 | Seelig et al. | 463/20 |
| 5,938,200 | A * | 8/1999 | Markowicz et al. | 273/246 |
| 5,980,384 | A * | 11/1999 | Barrie | 463/16 |
| 6,203,430 | B1 * | 3/2001 | Walker et al. | 463/20 |
| 6,210,275 | B1 * | 4/2001 | Olsen | 463/16 |
| 7,326,115 | B2 * | 2/2008 | Baerlocher | 463/25 |
| 8,241,113 | B2 * | 8/2012 | Rommerdahl et al. | 463/27 |
| 2002/0132658 | A1 * | 9/2002 | Brown et al. | 463/16 |
| 2003/0078091 | A1 * | 4/2003 | Brandstetter et al. | 463/20 |
| 2004/0162134 | A1 * | 8/2004 | Walker et al. | 463/20 |
| 2005/0020340 | A1 * | 1/2005 | Cannon | 463/16 |
| 2005/0075158 | A1 * | 4/2005 | Walker et al. | 463/16 |
| 2008/0090651 | A1 * | 4/2008 | Baerlocher | 463/27 |
| 2009/0054121 | A1 * | 2/2009 | Saito | 463/6 |
| 2010/0035674 | A1 * | 2/2010 | Slomiany et al. | 463/9 |
| 2010/0120503 | A1 * | 5/2010 | Hoffman et al. | 463/20 |
| 2010/0137047 | A1 * | 6/2010 | Englman et al. | 463/6 |

* cited by examiner

*Primary Examiner* — Milap Shah
(74) *Attorney, Agent, or Firm* — Marvin Hein

(57) ABSTRACT

Disclosed are games, gaming machines, gaming systems and methods having a horserace bonus feature game including randomly generated icons which serve to advance one or more horses toward a finish line. In some embodiments, a progressive award associated with the winning horse is paid to a player. In other embodiments, multiple progressive awards may be paid in the event of a tie.

9 Claims, 17 Drawing Sheets

FIG.1
UNLIMITED
FREE SPINS!
$200.00
PLAY MAX BET to WIN JACKPOT!
SPORTS EXTRA
RACE!
WILD
101
102
103
104
105
BACK
EXIT
NEXT
BET
CREDITS

100

FIG. 2D
The Daily Times
RACE BONUS FEATURE
ANY 3 RACE! APPEARING ON OR WITHIN ONE POSITION OF THE FIRST PAYLINE ON REELS 1, 3, AND 5 AT THE SAME TIME AWARDS THE RACE BONUS FEATURE. THE RACE BONUS FEATURE CONSISTS OF CONTINUOUSLY AWARDED FREE GAMES, AND A GUARANTEED JACKPOT WIN WITH MAX CREDITS BET. MULTIPLE JACKPOT WINS ARE ALSO POSSIBLE.
THE FREE GAME REELS ARE DIFFERENT FROM THE BASE GAME REELS. THE AND RACE! SYMBOLS DO NOT APPEAR ON THE FREE GAME REELS. ALL FREE GAMES ARE PLAYED WITH THE LINE BETS THAT WERE IN PLAY WHEN THE BONUS FEATURE WAS TRIGGERED. 5 NEW SYMBOLS APPEAR ON THE FREE GAME REELS:
ONLY APPEARS ON
ONLY APPEARS ON REEL 2
ONLY APPEARS ON
ONLY APPEARS ON REEL 4
ONLY APPEARS ON

GAMES, GAMING MACHINES, SYSTEMS AND METHOD HAVING A HORSERACE BONUS FEATURE

RELATED APPLICATIONS

This application is a continuation of application Ser. No. 12/828,255, filed Jun. 30, 2010, which claims the benefit of Provisional Application Ser. No. 61/261,705, filed Nov. 16, 2009, both herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present embodiments are directed to wagering games, gaming machines, networked gaming systems and methods, in particular to wagering games, gaming machines, networked gaming systems and methods having bonus feature games.

2. Description of the Related Art

Various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

Some gaming machine games today include one or more progressive prize awards. In some configurations, the progressive prize may have a small probability of a player winning it; thus making it possible to have a larger progressive prize. In other game configurations, the progressive prize may be a small amount; thus allowing the player to win the progressive prize more frequently. In most typical game configurations, the player wins the progressive prize as a result of a specific game outcome within the primary or main game.

Feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

While gaming machines including feature games have been successful, there remains a need for feature games that provide players with enhanced excitement and an increased opportunity of winning.

SUMMARY OF THE INVENTION

Briefly and in general terms, there is disclosed a method for playing a secondary game in association with a primary wagering game on a gaming machine. The method includes activating the secondary game upon the occurrence of a predefined triggering event in the primary wagering game. The secondary game includes a first and second marker disposed in relation to a finish line on a screen of the gaming machine. Play of the secondary game begins by randomly generating various icons including a first bonus icon and a second bonus icon, wherein the first bonus icon is associated with the first marker and the second bonus icon is associated with the second marker. In one embodiment, the markers or symbols are icons of horses and the screen resembles a carnival style horse racing game. The image appears to be of horses racing toward a finish line.

The method also includes advancing the first marker one space closer to a finish line displayed on the screen each instance the first bonus icon is generated during play of the secondary game and advancing the second marker one space closer to the finish line displayed on the screen each instance the second bonus icon is generated during play of the secondary game. In one embodiment, play of the secondary game includes free plays until the first or second marker reaches the finish line.

During play of the secondary game, a first prize or progressive award is associated with the first marker and a second prize or progressive award is associated with the second marker. The method also includes awarding the first progressive award if the first marker reaches the finish line first and awarding the second progressive award if the second marker reaches the finish line first. If the first and second markers reach the finish line at the same time, the first and second progressive awards are both awarded. Once the first or second prize is awarded, play of the secondary game is deactivated and play of the primary wagering game is reengaged. In yet another embodiment of a method for playing a bonus game in association with a primary game, the method includes engaging in the play of the primary game on a slot machine having a plurality of reels. The slot machine may be a video slot machine and the primary game may be a slot game. Bonus game is activated upon the occurrence of a predefined triggering event in the primary game. The reels of the slot machine include a first bonus icon and a second bonus icon, wherein the first bonus icon is associated with a first marker and the second bonus icon is associated with a second marker. First and second markers are disposed in relation to a finish line displayed on a screen of the slot machine. In one embodiment, the markers or symbols are icons of horses and the screen resembles a carnival style horse racing game. The image appears to be of horses racing toward a finish line.

This method also includes awarding free spins of the reels during play of the bonus game and awarding a payout according to a pay table for the primary game during play of the bonus game. During the free spins, the first marker is advanced one space closer to a finish line displayed on the screen each instance the first bonus icon appears on the reels of the slot machine and the second marker is advanced one space closer to the finish line displayed on the screen each instance the second bonus icon appears on the reels.

Also, a first prize associated with the first marker and a second prize associated with the second marker is displayed on the slot machine. The method includes awarding the first prize if the first marker reaches the finish line first and awarding the second prize if the second marker reaches the finish line first. It is possible to award both the first and second prizes if the first and second markers reach the finish line at the same time. In one embodiment, the first and second prizes are progressive prizes. However, the first and second prizes may also be set amounts. After the first or second prize has been awarded, the method includes deactivating the bonus game and re-engaging the play of the primary game.

In a further embodiment, a system for providing a bonus game to be played in conjunction with a main game is disclosed. The system includes a gaming device configured to enable play of the main game and the bonus game, wherein the bonus game is initiated upon the occurrence of a predefined triggering event in the primary game. In one embodiment, the gaming device is a video slot machine. Also, the gaming device is capable of randomly generating icons including a first bonus icon and a second bonus icon, wherein the first bonus icon is associated with a first symbol and the second bonus icon is associated with a second symbol, and the first and second symbols are displayed on a screen of the gaming device having a position relative to a finish line displayed on the screen. In one embodiment, the symbols are icons of horses and the screen resembles a carnival style horse racing game. The image appears to be of horses racing toward a finish line.

The system also includes a progressive controller in communication with the gaming device that calculates a value for multiple progressive prizes available during play of the bonus game. Furthermore, the gaming device awards free spins during play of the bonus game and awards a payout according to the main game during play of the bonus game. During play of the bonus game, the gaming device advances the first symbol one space closer to the finish line displayed on the screen each time the first bonus icon is generated during play of the bonus game and advances the second symbol one space closer to the finish line displayed on the screen each time the second bonus icon is generated. The gaming device awards a first progressive prize associated with the first symbol if the first symbol reaches the finish line first and the gaming device awards a second progressive prize associated with the second symbol if the second symbol reaches the finish line first.

Features and advantages will become apparent from the following detailed description, taken in conjunction with the accompanying drawings, which illustrate by way of example, the features of the various embodiments.

DETAILED DESCRIPTION OF THE INVENTION

Figure 1:
FIG. 1 provides an overview of a primary game of one embodiment of the invention.

Various embodiments are directed to a game, gaming machine, gaming networks and method for playing a game, wherein the game includes a horserace bonus feature game. The embodiments are illustrated and described herein, by way of example only, and not by way of limitation. Referring now to the drawings, and more particularly to FIGS. 1-8, there are shown illustrative examples of games, gaming machines, gaming networks and methods for playing a game in accordance with various aspects of the invention.

Figure 2A:
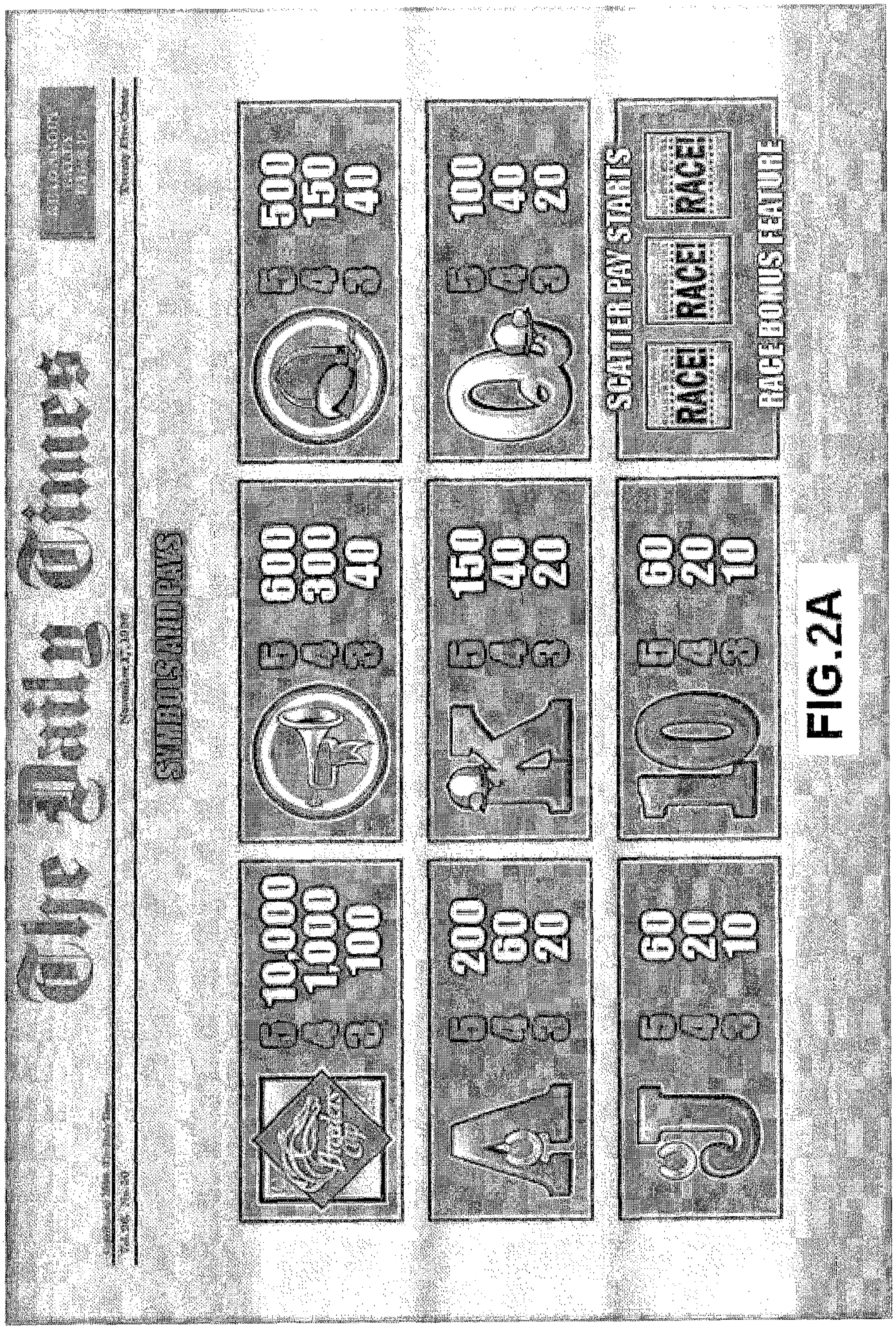
FIGS. 2A-2G illustrate example help screens in accordance with one or more embodiments of the invention.
Figure 2B:
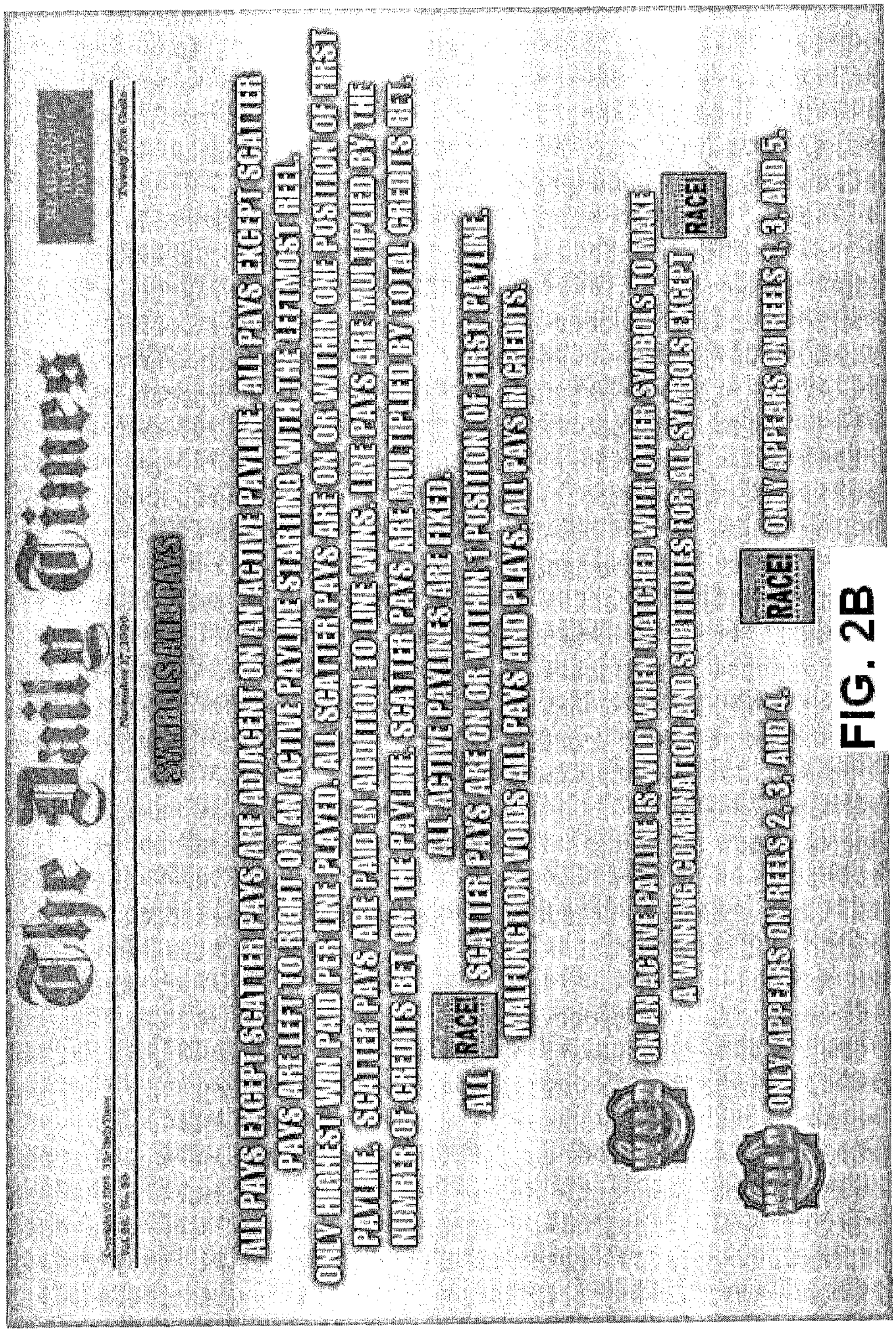
Figure 2C:
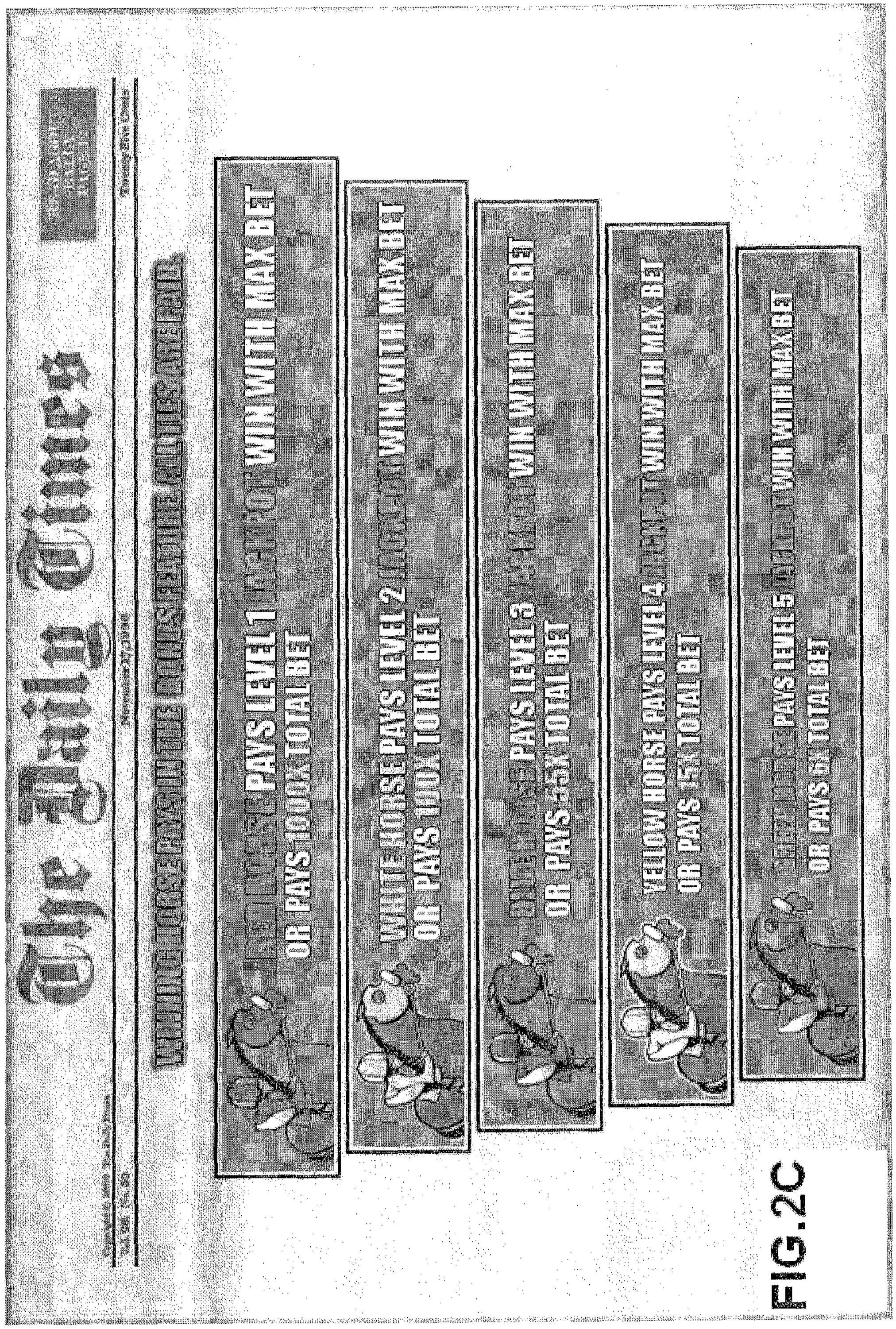
Figure 2D:
Figure 2E:
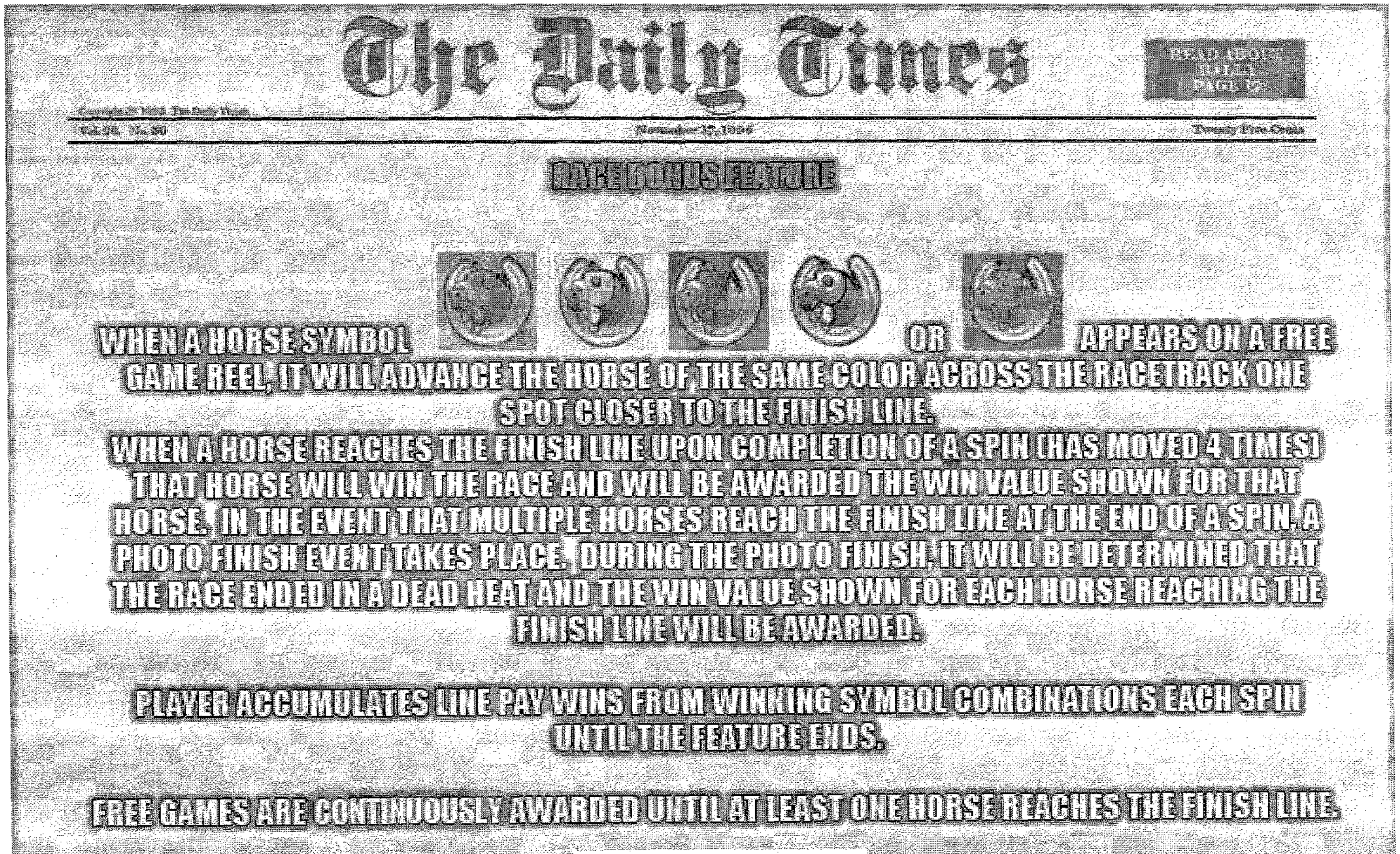
Figure 2F:
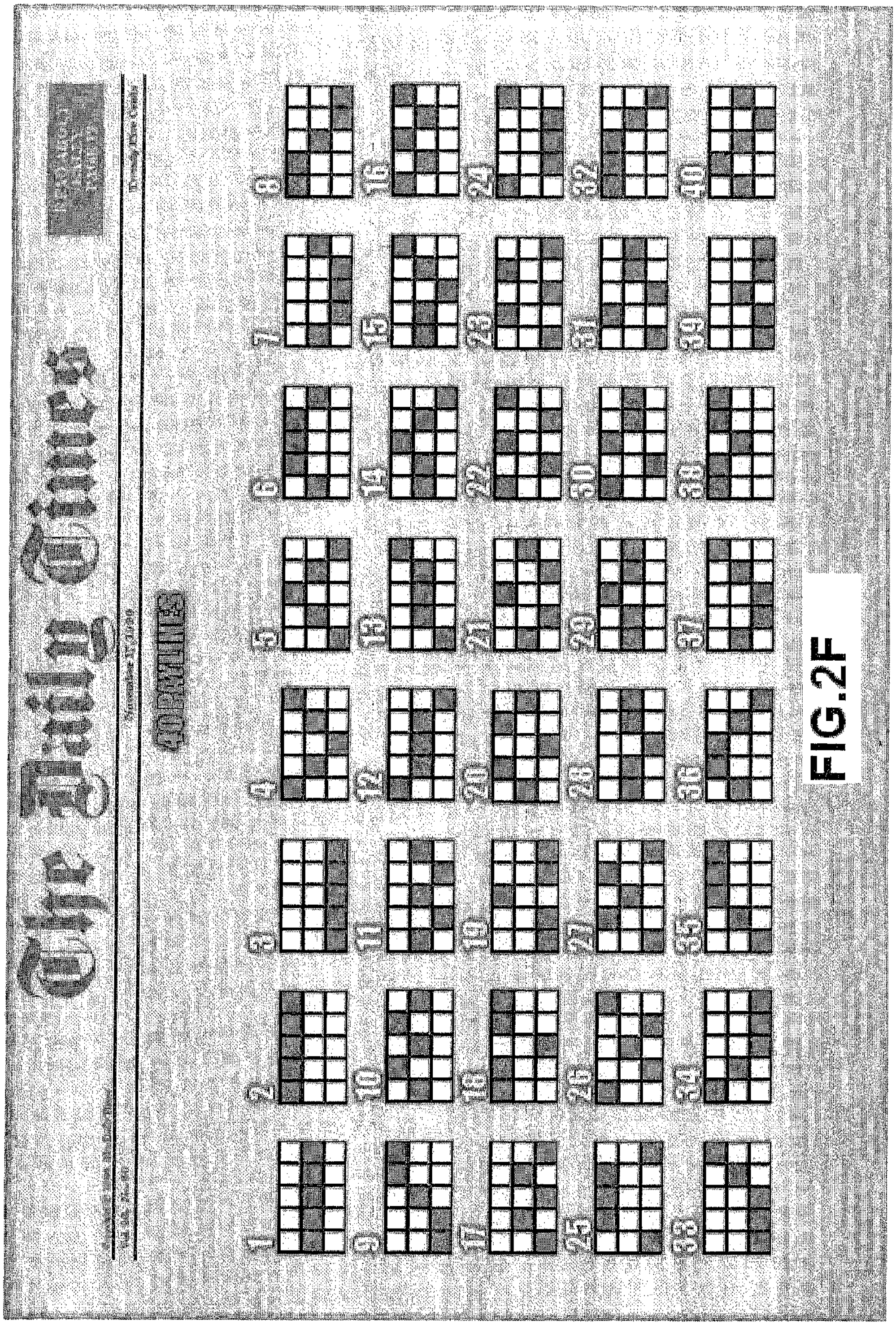
Figure 2G:
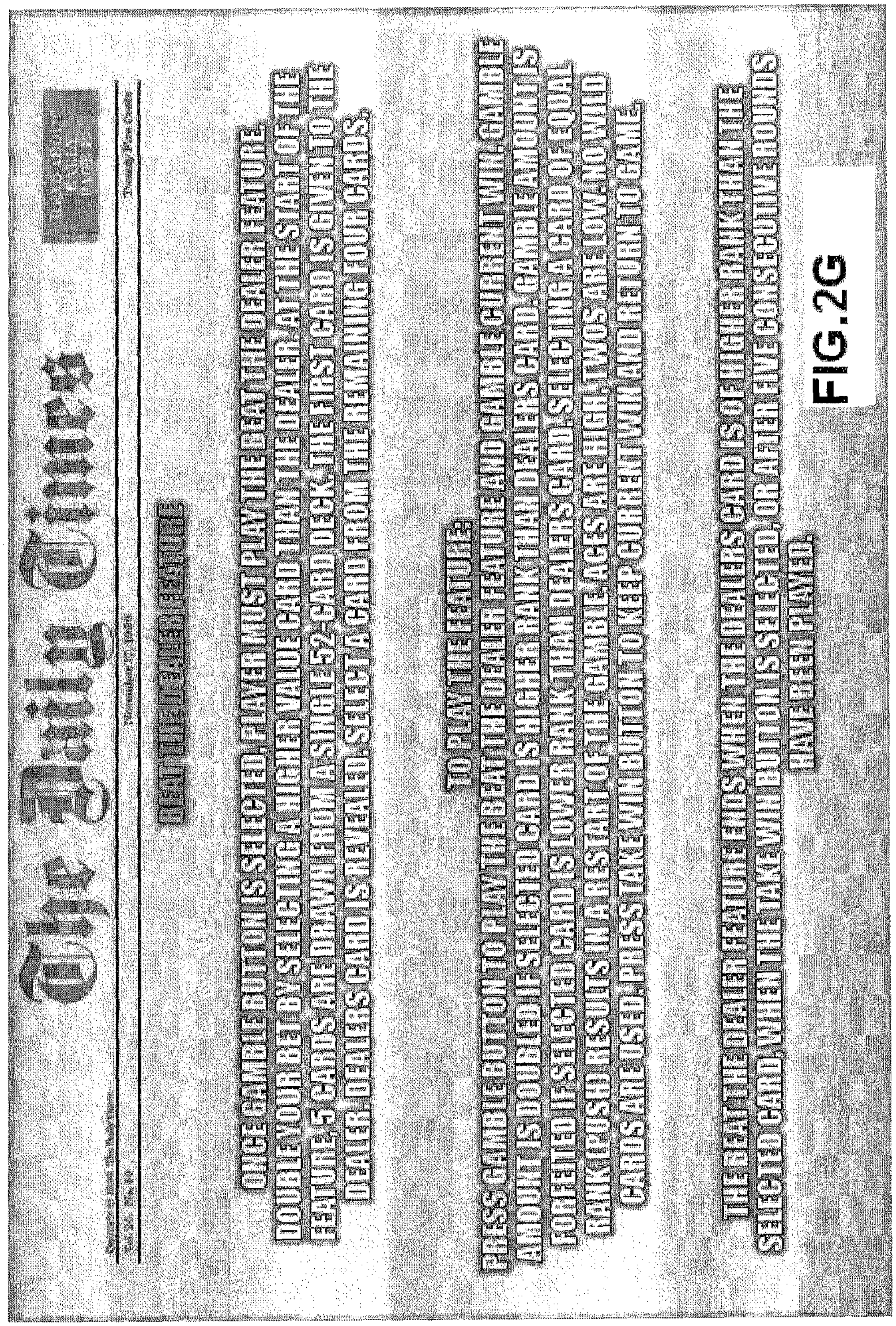
Figure 3:
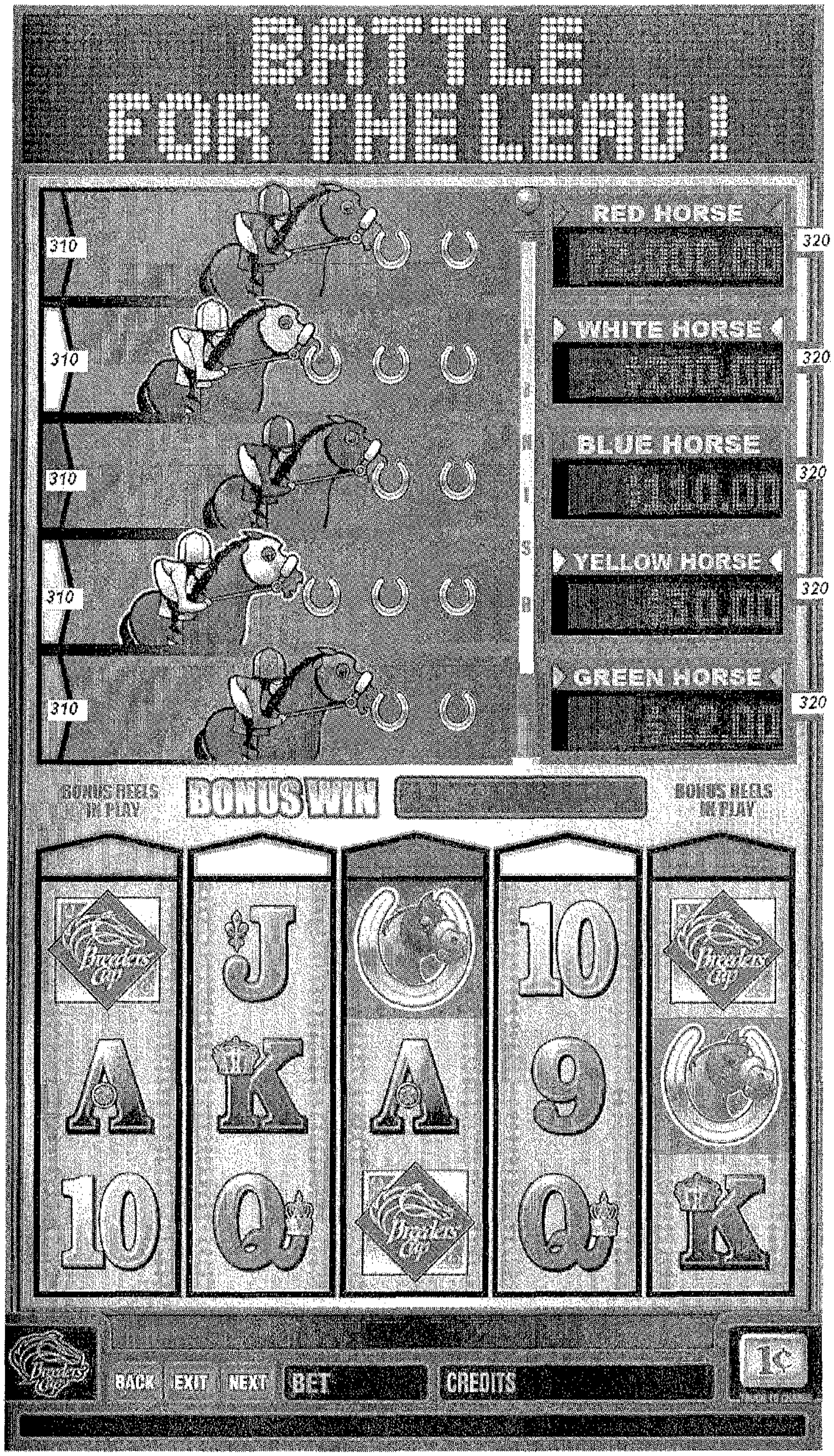
FIG. 3 illustrates an example feature game display in accordance with one or more embodiments of the invention.

An example game is shown in FIGS. 1-3. Referring to FIG. 1, game 100 is implemented using five spinning reels 101-105. Each of 40 pay line patterns (FIG. 2F) passes through one indicium on each of the five reels. The number of pay lines and their patterns are by way of example only and may vary. The player selects the number of played pay lines and the number of credits or coins wagered on each line using touch screen controls or gaming device control buttons. A credit meter provides the player with information about the amount paid by the last game played and the total number of credits available for play. A bet meter displays the size of the currently selected wager. The player may collect the balance of his credits by pressing a collect button (not shown).

The player initiates game play by pressing a spin button (not shown). In some embodiments, the player may simultaneously select all pay lines at the maximum number of coins or credits allowed per line by pressing a max bet button (not shown). Various controls/buttons (see FIG. 4, 460) on gaming machine 400 (FIG. 4) or touch screen buttons may be used to perform the actions described here without deviating from the scope of the invention. Reels 101-105 are made to spin and stop in predetermined stop positions. A determination is made whether the stop positions of the reels represents a winning game outcome.

Referring to FIGS. 2A-2G, in accordance with one or more embodiments, the player may view various pay table displays on the primary game display by way of a GAME INFO (FIG. 1) or similar button. These displays describe the rules and play of the primary and feature games. In alternate embodiments, the pay table displays may be presented on a second video or printed display attached to the gaming device (i.e. display 453 or "pay glass" 452, FIG. 4). A winning combination, for example, could be three or more symbols scattered one per reel from left to right. For each winning combination, the game device awards the player the award in the pay table, adjusted as necessary based on the number of credits wagered on the pay line on which the win occurred.

In some embodiments, various primary game outcomes may be utilized to trigger the play of a feature game, including, but not limited to, awarding feature play when certain symbols appear on a pay line, when certain symbols are scattered, when no symbols of a certain type appear, when a certain winning combination occurs or, regardless of the visible symbols, at random or fixed intervals. Referring to FIG. 2D, in accordance with one embodiment of the invention, three "RACE!" symbols scattered from left-to-right on reels 101, 103 and 105 may trigger play of a feature game. The availability of the feature game may be restricted based on the size of the wager or a percentage of each wager may be explicitly allocated to the funding of the feature games.

In accordance with one or more embodiments, FIG. 3 illustrates a feature game having a horserace bonus game played according to rules described on FIG. 2E. The game provides a carnival style horse racing bonus game wherein the player gets unlimited free spins until at least one of five horses arrives at the finish line. In accordance with one or more embodiments, the player collects regular line pays during the free spins according to the pay table illustrated in FIGS. 2A and 2B. Each horse has an associated icon that appears on one and only one of the five reels. (per FIG. 2D) Horses move one space forward any time their associated icon appears on a reel during free spins. During the free spins, horse movement symbols advance indicators (FIG. 3; 310) showing the position of each horse. During the race, the game provides audio in the form of race announcer banter during each horse movement. The commentary is unique for each race, as it takes into account actual horse positioning after every movement.

Free spins continue until at least one horse completes the trip to the finish line. For example, once at least one horse has moved 4 spaces, it reaches the finish line and the free spins stop. The player collects all line win pays up to that point. The player is also awarded the progressive award 320 associated with the horse that reached the finish line first. If multiple horses finish at the same time, a Photo Finish event takes place that determines that the race ended in a dead heat. All horses that finished will have their progressives awarded to the player provided the player placed a maximum wager, otherwise, other values may be paid. (FIG. 2C)

The progressive awards 320 may be calculated by a progressive controller such as a controller manufactured by Mikohn, Inc. The progressive controller monitors wagering during base game play, calculates a current value for one or more progressive jackpot pools and transmits the current pool values to the gaming machine. In one or more embodiments, progressive awards are accumulated during regular play as a percentage, such as three percent, of the game play take. The prizes may be sized according to the preferences of the casino operator. The number of prizes may vary without deviating from the scope of the invention. The size of the prizes is dependent on the amount of play prior to initiating feature play and may come from the contributions of a single gaming machine or a number of linked gaming machines. In another aspect, the prizes may be set amounts established by the casino operator from non-coin-in funds, such as marketing funds. The probability of winning one of the progressives may be dependent on the size of the wager made by the player, with a larger wager making it more likely that a progressive will be won. Alternately, the progressive prize awarded may be a percentage of the total progressive pool, the percentage based on wager size.

In one or more embodiments, the prizes for progressive awards may be accumulated based on funding mechanisms other than a percentage of wagers accumulated by the gaming machine. For example, an operator may initially fund various award pools with a pre-determined amount of money, such as $1,000 for the red horse's progressive, $100 for the white horse's progressive and so on. Subsequently, the casino operator may determine to increase the amounts of one or more of the awards at pre-determined times which may be periodically or randomly selected with a range of times or periods. Once a winner has occurred at any level, the award levels may be rolled back to their initial funding amount. In one or more embodiments, only the winning award level is rolled back to the initial funding amount.

In one or more embodiments, the awards assigned to each winning horse may be set amounts, i.e. non-progressive. In some embodiments, the algorithms to determine the amounts may be determined by a statistical percentage based on an average take of a gaming machine and the likelihood of the win over a period of time. In the case where one or more gaming machines are networked, a common award table may be utilized where the award algorithms are determined based on an average take (total wagers) of all the networked gaming machines and the likelihood of a win of an award over a period of time. Each award may be calculated in a similar manner based on the likelihood of a winning outcome being achieved during a game play session.

Figure 4:
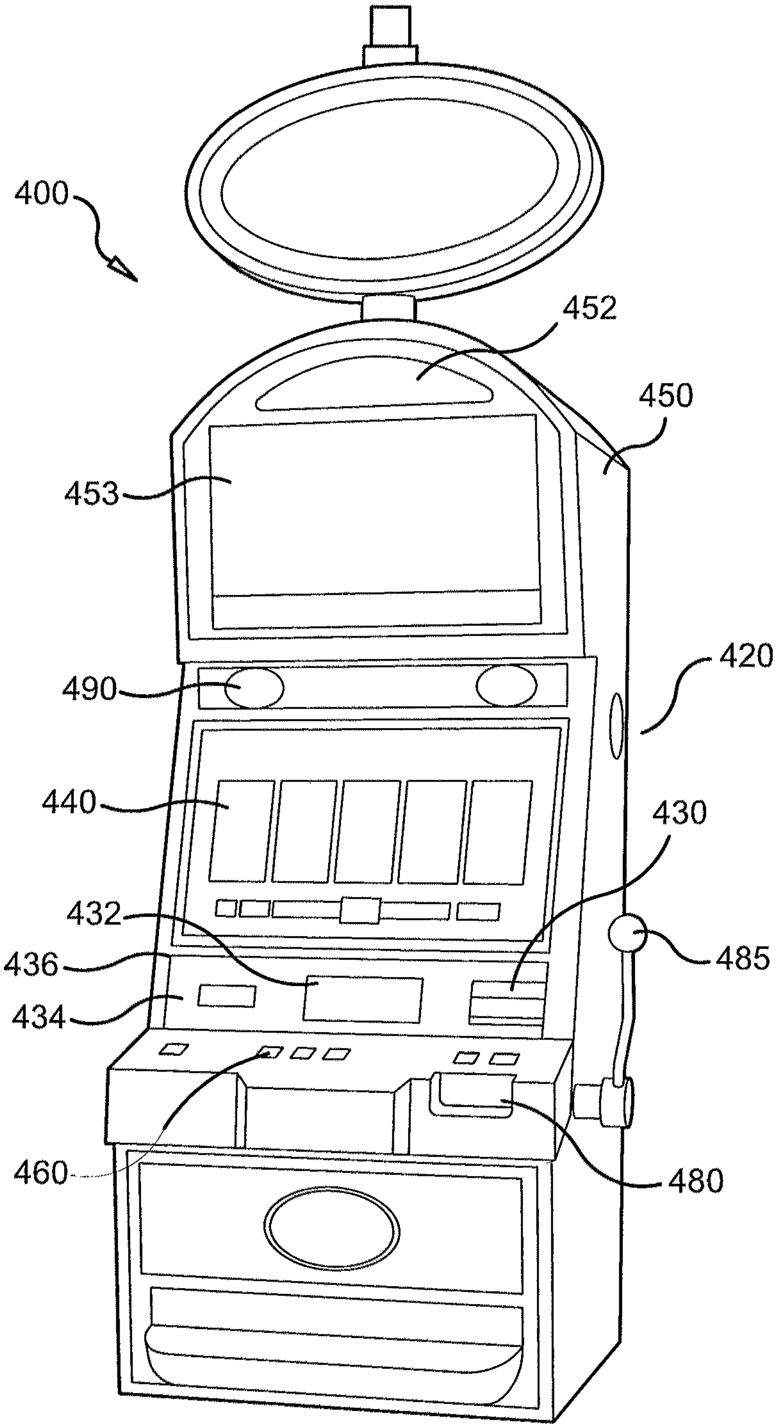
FIGS. 4 and 4A are perspective views of a gaming machine in accordance with one or more embodiments.

In accordance with one or more embodiments, FIG. 4 illustrates a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480 and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

The plurality of player-activated buttons 460 may be used for various functions such as, but not limited to, selecting a wager denomination, selecting a game to be played, selecting a wager amount per game, initiating a game, or cashing out money from gaming machine 400. Buttons 460 function as input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display

432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a wheel game or the like.

Figure 4A:
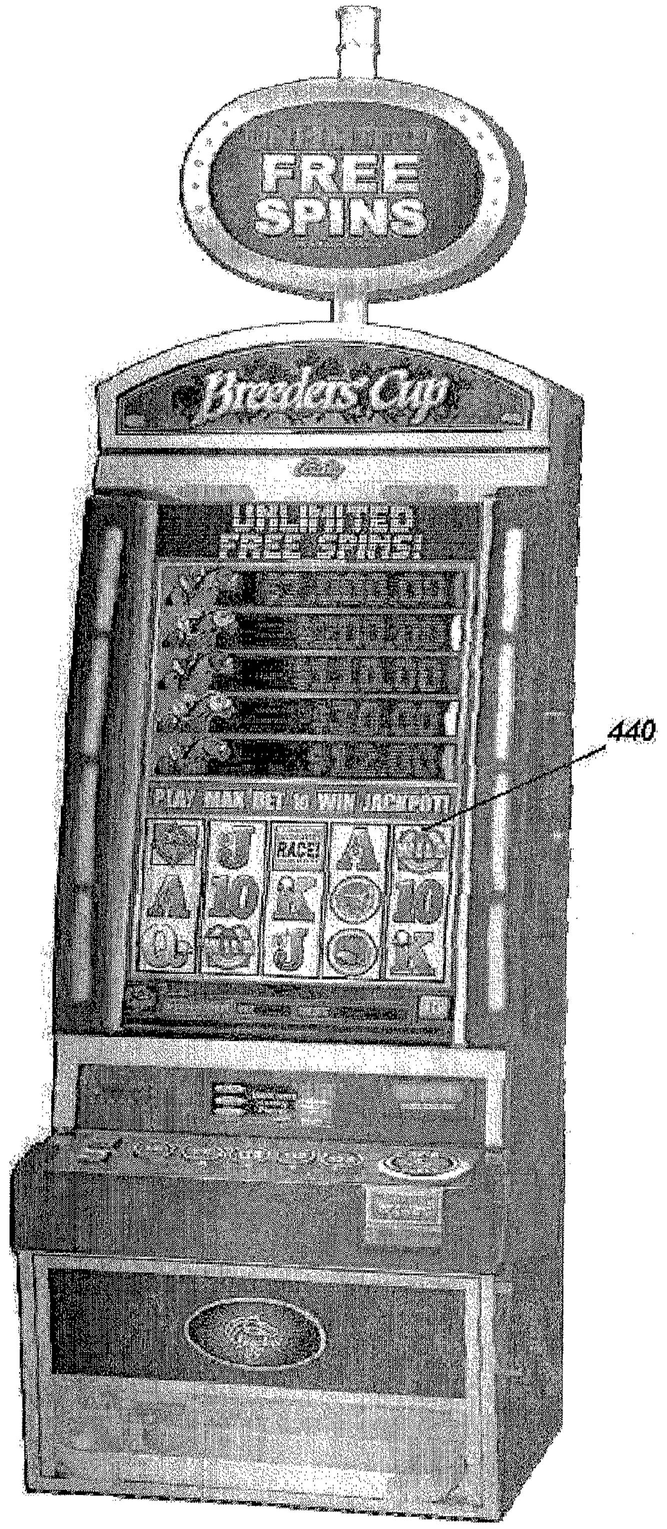

Mechanical or video/mechanical embodiments may include game displays such as mechanical reels, wheels, or dice as required to present the game to the player. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. A widescreen display in a "portrait" orientation may be 32 inches tall by 18 inches wide. FIG. 4A illustrates an example of a portrait mode game display 440 having widescreen dimensions in accordance with one embodiment of the invention. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference.

Game display 440 may also present information such as, but not limited to, player information, advertisements and casino promotions, graphic displays, news and sports updates, or even offer an alternate game. This information may be generated through a host computer networked with gaming machine 400 on its own initiative or it may be obtained by request of the player using either one or more of the plurality of player-activated buttons 460; the game display itself, if game display 440 comprises a touch screen or similar technology; buttons (not shown) mounted about game display 440 which may permit selections such as those found on an ATM machine, where legends on the screen are associated with respective selecting buttons; or any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 5A:
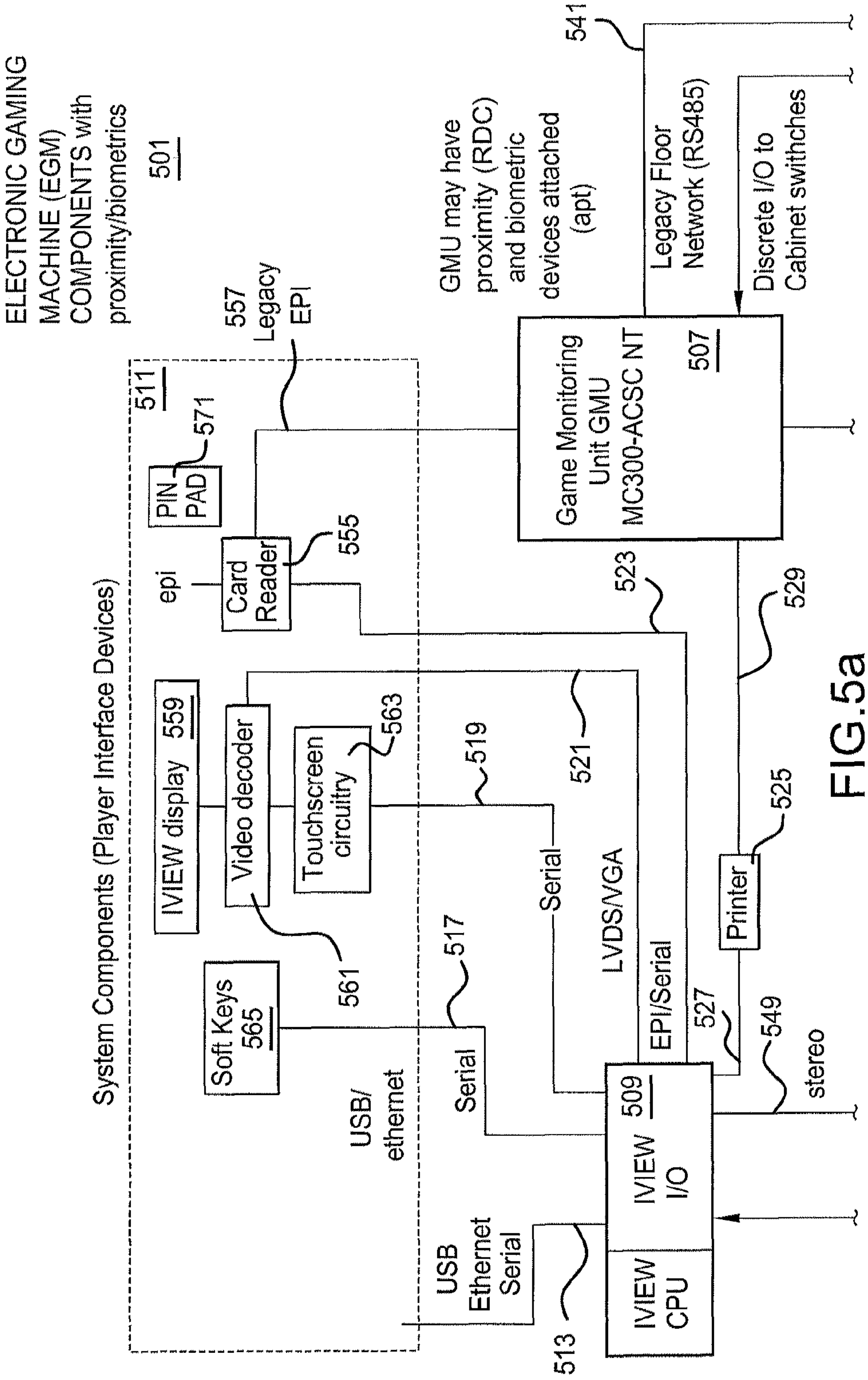
FIG. 5 is a block diagram of the physical and logical components of the gaming machine of FIG. 4.
Figure 5B:
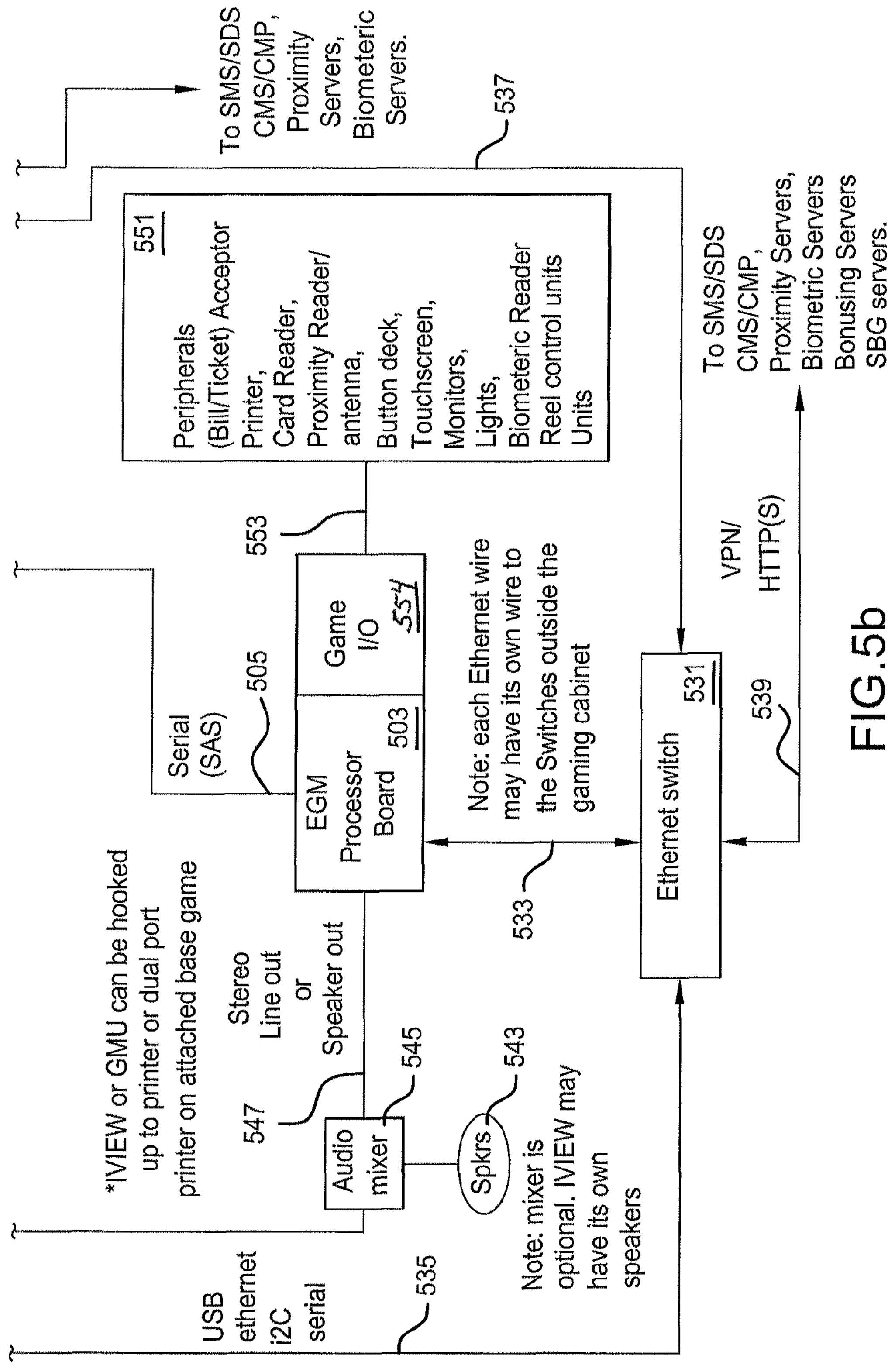

Referring to FIG. 5, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iView unit. Coding executed on EGM Processor Board 503, PID 509, and/or GMU 507 may be upgraded to integrate a game having a horserace bonus feature game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having a horserace bonus feature game. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 400; for example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, display 559 through video decoder 561 and bus 521, such as an LVDS or VGA bus.

As part of its programming, the PID processor executes coding to drive display 559 and provide messages and information to a player. Touch screen circuitry interactively connects display 559 and video decoder 561 to PID 509, such that a player may input information and cause the information to be transmitted to PID 509 either on the player's initiative or responsive to a query by PID 509. Additionally soft keys 565 connect through bus 517 to PID 509 and operate together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iVIEW processing board and game monitoring unit (GMU) processing board. The GMU and iVIEW can combined into one like the commercially available Bally GTM iVIEW device. This device may have a video mixing technology to mix the EGM processor's video signals with the iVIEW display onto the top box monitor or any monitor on the gaming device.

Figure 6:
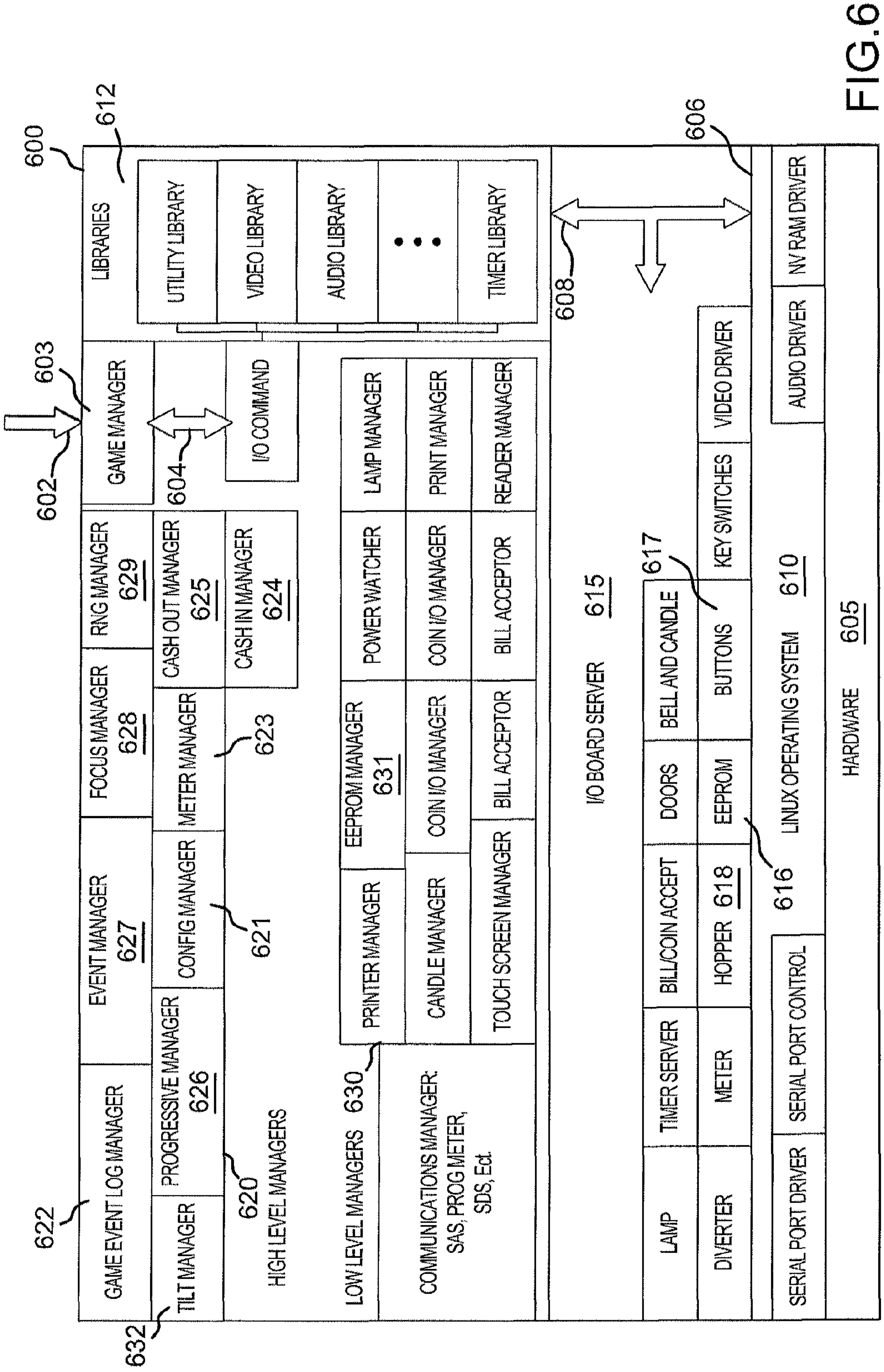
FIG. 6 is a block diagram of the logical components of a gaming kernel in accordance with one or more embodiments of the invention.

In accordance with one or more embodiments, FIG. 6 is a functional block diagram of a gaming kernel 600 of a game program under control of processor board 503, uses gaming kernel 600 by calling into application programming interface (API) 602, which is part of game manager 603. The components of game kernel 600 as shown in FIG. 6 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's (622) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash in (624) and cash out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a callback posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernal for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 7:
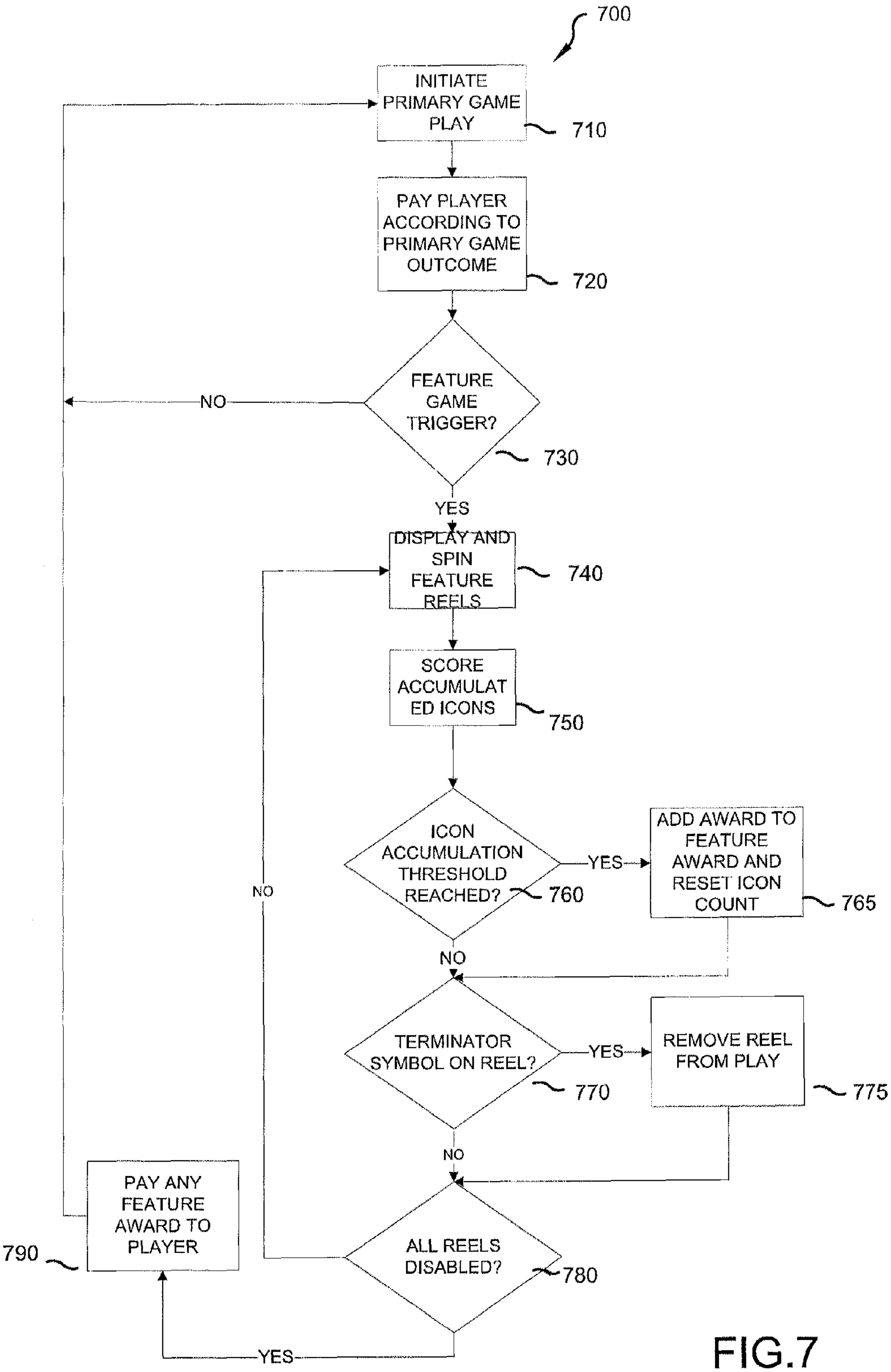
FIG. 7 is a functional block diagram depicting the steps associated with carrying out an example method in accordance with one or more embodiments.

A logical flow diagram generally depicting the steps associated with a method 700 for carrying out a game having a horserace bonus, in accordance with one aspect of the invention, is presented in FIG. 7. The order of actions as shown in FIG. 7 is only illustrative, and should not be considered limiting. For example, the order of the actions may be changed, additional steps may be added or some steps may be removed without deviating from the scope and spirit of the invention.

Still referring to FIG. 7, a player may initiate primary game play at step 710 on a gaming machine including the bonus feature. Play of the primary game occurs as normal with the player being played according to the primary game outcome at step 720. At step 730, the method checks to see if the feature game has been triggered. As discussed above, in one embodiment, the feature or bonus game is triggered when three "RACE!" symbols appear on the reels from left to right. If the feature game has not been triggered, then the method returns to step 710 and primary game play continues.

On the other hand, if the feature game has been triggered, the feature reels are displayed and spun at step 740. In one embodiment, the feature reels differ from the primary game reels because the feature reels do not include "RACE!" symbols or wild card symbols. At step 740, the player receives free spins and the player is paid according to the primary game outcome at the end of each spin at step 750. If a horse symbol or icon appears on or within one space of the first pay line, the method at step 760 advances the representative horse on the screen one space closer to the finish line. The method then checks at step 770 if any of the horses in the feature game have reached the finish line. If no horse has reached the finish line then the player receives another free spin. However, if one or more horses have reached the finish line, then the player is awarded one or more progressive prizes associated with the horse(s) that reached the finish line at step 775. After awarding the progressive(s) prize, the method returns to step 710.

Figure 8A:
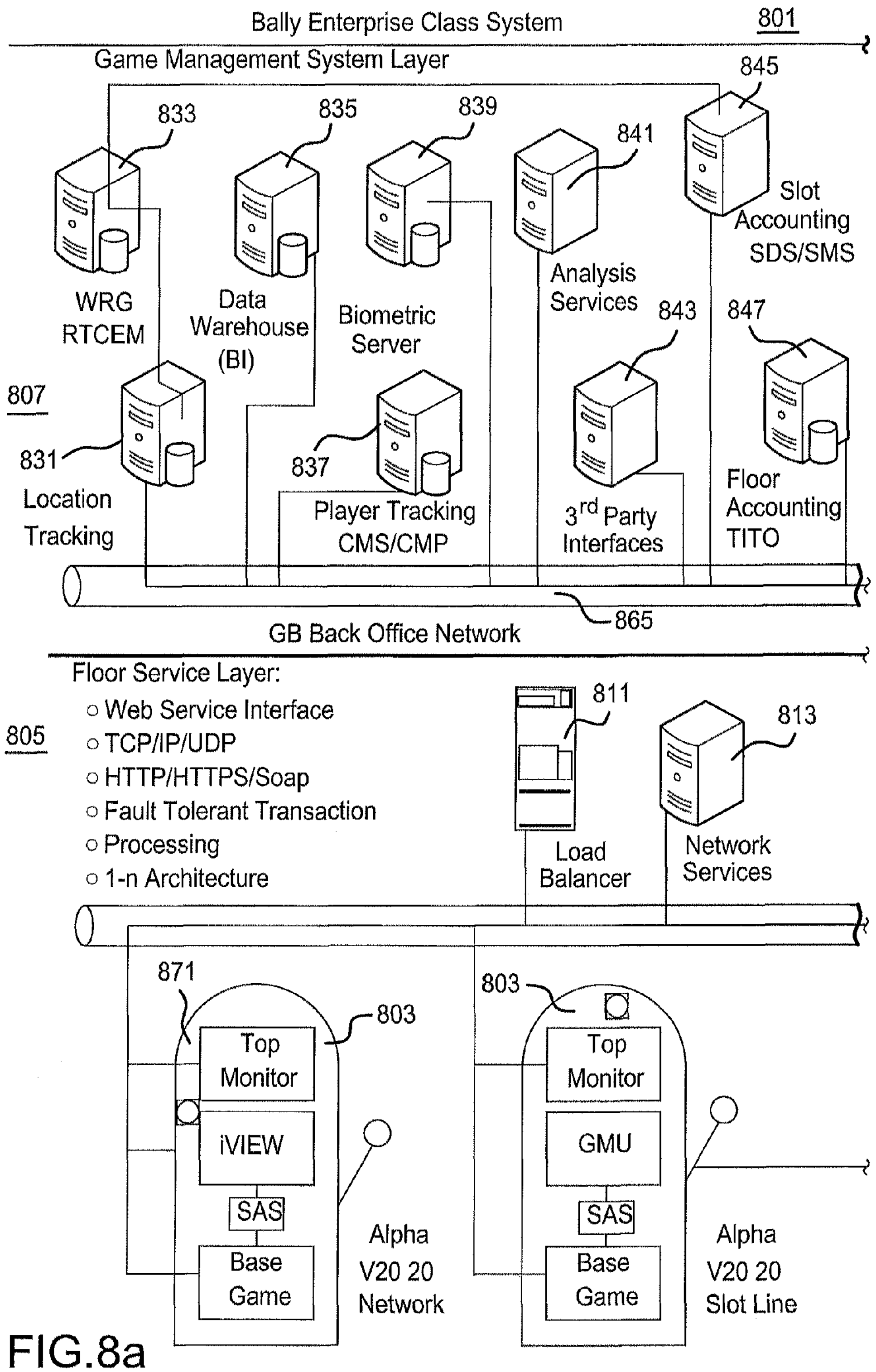
FIG. 8 is a schematic block diagram showing the hardware elements of a networked gaming system in accordance with one or more embodiments.
Figure 8B:
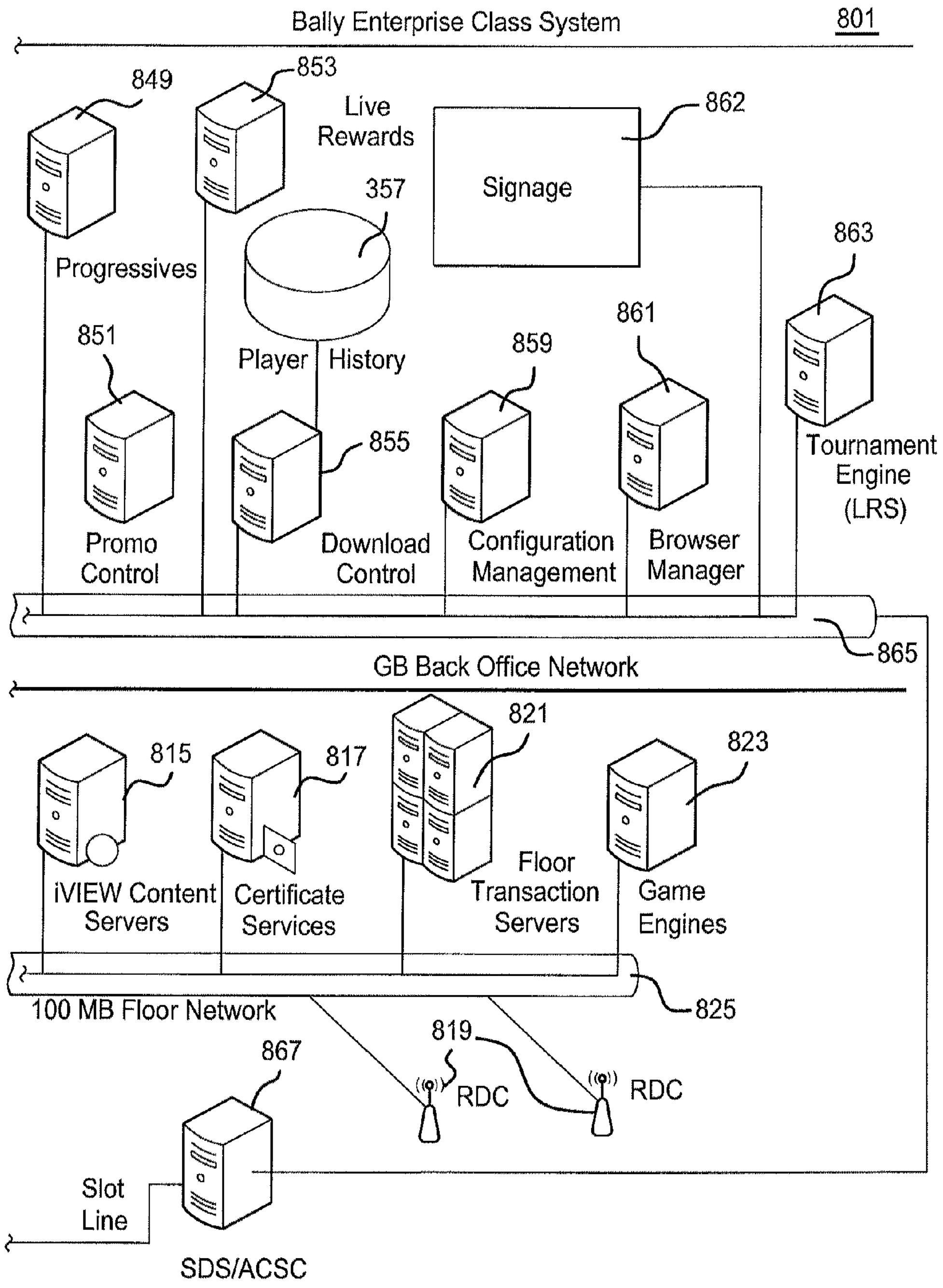

Referring to FIG. 8, enterprise gaming system 801 is shown in accordance with one or more embodiments. Enterprise gaming system 801 may include one casino or multiple locations and generally includes a network of gaming machines 803, floor management system (SMS) 805, and casino management system (CMS) 807. SMS 805 may include load balancer 811, network services servers 813, player interface (iVIEW) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 305 servers and devices, firmware, media, operating systems, and configurations may be downloaded to the system components of respective gaming machines for upgrading or managing floor content and offerings in accordance with operator selections or automatically depending upon CMS 807 and SMS 805 master programming. The data and programming updates to gaming machines 803 are authenticated using conventional techniques prior to install on the system components.

In various embodiments, any of the gaming machines 803 may be a mechanical reel spinning slot machine, video slot machine, video poker machine, video bingo machine, keno machine, or a gaming machine offering one or more of the above described games including a horserace bonus game. Alternately, gaming machines 803 may provide a game with a horserace bonus feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled “Networked System and Method for Group Gaming,” filed on Nov. 9, 2007, which is hereby incorporated by reference in its entirety for all purposes.

Those skilled in the art will readily recognize various modifications and changes that may be made to the claimed invention without following the example embodiments and applications illustrated and described herein, and without departing from the true spirit and scope of the claimed invention.

What is claimed is:

1. A gaming machine comprising:

at least one display device;

at least one input device;

at least one processor communicatively coupled to the at least one display device and the at least one input device;

wherein, the processor is programmed to display a primary wagering game and a secondary game on the at least one display device;

wherein, upon the occurrence of a predefined triggering event in the primary wagering game, the secondary game is displayed on the at least one display device, the secondary game including a first marker and a second marker disposed a plurality of spaces away from a finish line;

whereupon the processor randomly generates a plurality of symbols during play of the secondary game, the plurality of symbols including at least one first bonus symbol and at least one second bonus symbol, wherein the first bonus symbol is associated with the first marker and the second bonus symbol is associated with the second marker; and wherein, the processor is configured to:

advance the first marker one space closer to the finish line displayed on the at least one display device for each occurrence of the first bonus symbol during play of the secondary game;

advance the second marker one space closer to the finish line displayed on the at least one display device for each occurrence of the second bonus symbol during play of the secondary game;

associate a first progressive award with the first marker and a second progressive award with the second marker; and award the first progressive award if the first marker advances across the plurality of spaces and reaches the finish line first and awarding the second progressive award if the second marker advances across the plurality of spaces and reaches the finish line first.

2. The gaming machine of claim 1, further comprising the processor being configured to award the first and second progressive awards if the first and second markers reach the finish line at the same time.

3. The gaming machine of claim 1, wherein the first and second markers represent horses racing towards the finish line.

4. The gaming machine of claim 3, wherein the first and second bonus symbols resemble the horses represented by the first and second markers.

5. The gaming machine of claim 1, wherein the secondary game includes free plays until the first or second marker reaches the finish line.

6. A system for providing a bonus game to be played in conjunction with a main game, the system comprising:

a gaming device configured to (i) enable play of the main game, (ii) enable play of the bonus game, the bonus game being initiated upon the occurrence of a predefined triggering event, and (iii) randomly generate a plurality of symbols during play of the bonus game, the plurality of symbols including a first bonus symbol and a second bonus symbol;

wherein the first bonus symbol is associated with a first symbol and the second bonus symbol is associated with a second symbol, wherein, the first and second symbols are displayed, on a display device of the gaming device, having a position a plurality of spaces away from a finish line displayed on the display device; and a progressive controller in communication with the gaming device that calculates values for multiple progressive prizes available during play of the bonus game;

wherein, the gaming device awards a plurality of free spins of the randomly generated plurality of symbols during play of the bonus game and awards a payout according to a pay table during play of the bonus game, wherein, the gaming device advances the first symbol one space closer to the finish line displayed on the display device for each occurrence of the first bonus symbol during play of the bonus game and advances the second symbol one space closer to the finish line displayed on the display device for each occurrence of the second bonus symbol during play of the bonus game; and wherein, during play of the bonus game, the gaming device awards a first progressive prize of the multiple progressive prizes associated with the first symbol if the first symbol advances the plurality of spaces and reaches the finish line first and the gaming device awards a second progressive prize of the multiple progressive prizes associated with the second symbol if the second symbol advances the plurality of spaces and reaches the finish line first.

7. The system of claim 6, wherein the gaming device is a video slot machine.

8. The system of claim 6, wherein the first and second symbols are icons of different horses.

9. The system of claim 6, further comprising the gaming device awarding both the first and second progressive awards if the first and second symbols reach the finish line at the same time.

* * * * *